(12) United States Patent
Carpenter et al.

(10) Patent No.: US 6,323,157 B1
(45) Date of Patent: Nov. 27, 2001

(54) BASE OIL FOR WELL FLUIDS HAVING LOW POUR POINT TEMPERATURE

(75) Inventors: Joel F. Carpenter, Naperville, IL (US); Jose Toye, Boussoit (BE)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/463,533
(22) PCT Filed: Aug. 8, 1997
(86) PCT No.: PCT/US97/14008
§ 371 Date: Jan. 25, 2000
§ 102(e) Date: Jan. 25, 2000
(87) PCT Pub. No.: WO99/07805
PCT Pub. Date: Feb. 18, 1999

(51) Int. Cl.$^7$ ................. C09K 7/06; C09K 7/00
(52) U.S. Cl. ......................... 507/103; 507/905
(58) Field of Search .................. 507/103, 203, 507/905; 585/664, 665, 666, 667, 668, 669, 670, 671; 166/305.1

(56) References Cited

U.S. PATENT DOCUMENTS

| | | | |
|---|---|---|---|
| 3,409,649 | * | 11/1968 | Keblys ................................. 585/668 |
| 4,168,284 | * | 9/1979 | Connor ................................. 585/668 |
| 4,587,374 | * | 5/1986 | Peters ................................... 585/670 |
| 5,432,152 | | 7/1995 | Dawson et al. .................... 507/103 |
| 5,498,596 | * | 3/1996 | Ashjian et al. ...................... 507/103 |
| 5,589,442 | | 12/1996 | Gee et al. ........................... 507/103 |
| 5,627,143 | * | 5/1997 | Sawdon ............................... 507/103 |
| 5,691,281 | * | 11/1997 | Ashjian ............................... 507/103 |
| 5,741,759 | * | 4/1998 | Gee et al. ........................... 507/103 |
| 5,789,645 | * | 8/1998 | Cox ..................................... 585/665 |
| 5,849,974 | | 12/1998 | Clarembeau et al. ............... 585/668 |
| 5,851,958 | * | 12/1998 | Halliday et al. .................... 507/103 |
| 5,869,434 | * | 2/1999 | Mueller et al. ..................... 507/103 |
| 6,054,415 | * | 4/2000 | Gee et al. ........................... 507/103 |
| 6,057,272 | * | 5/2000 | Gee et al. ........................... 507/103 |

FOREIGN PATENT DOCUMENTS

787706 * 8/1997 (EP) .
95212225 8/1995 (WO) .............................. C09K/7/00

* cited by examiner

*Primary Examiner*—Philip Tucker
(74) *Attorney, Agent, or Firm*—Joseph DiSalvo

(57) ABSTRACT

Disclosed are compositions having utility as well fluid base oils. The base oils are comprised of a mixture of internal predominantly linear tetradecene (C14) isomers and internal predominantly linear hexadecene (C16) isomers. The base oils of this invention have pour point temperatures lower than −25° C. and are environmentally acceptable to marine life. The base oils disclosed are ideal candidates for use in cold climates and for offshore drilling.

1 Claim, No Drawings

BASE OIL FOR WELL FLUIDS HAVING LOW POUR POINT TEMPERATURE

FIELD OF THE INVENTION

The invention relates generally to compositions which are mixtures of olefins and olefin isomers having utility as base oils for well fluids. More specifically, the base oils of this invention are environmentally friendly and have very low pour point temperatures. These properties make the base oils of this invention ideal candidates for use as components of well fluids for cold climates and offshore applications.

BACKGROUND OF THE INVENTION

Historically, first crude oils, then diesel oils and, more recently, mineral oils have been used in formulating well fluids. Due to problems of toxicity and persistence which are associated with these oils, and which are of special concern of offshore use, the industry is developing well fluids which are based on "pseudo-oils". Examples of such oils are fatty acid esters and synthetic hydrocarbons such as poly(alpha) olefins. Fatty acid ester based oils have excellent environmental properties, but well fluids made with these esters tend to have lower densities and are prone to hydrolytic instability. Poly(alpha)olefin based well fluids can be formulated to high densities, have good hydrolytic stability and low toxicity. They are, however, somewhat less biodegradable than esters, they are expensive and the fully weighted, high density fluids tend to be overly viscous, especially when used in cold climates. A most recent trend in the industry is the use of base oils comprising mixtures of predominantly linear internal olefins. Well fluid base oils comprised of mainly linear internal olefins are acceptably environmentally friendly and have pour point temperatures in the range of about −10° C. which is borderline for cold climates. What is needed is an environmentally acceptable well fluid base oil having a pour point lower than −25° C. The present invention addresses this need.

INVENTION SUMMARY AND PRIOR ART REVIEW

In a broad sense, therefore, this invention relates to novel compositions suitable for use as well fluid base oils which have especially advantageous and unexpectedly low pour point temperatures as low as −39° C. This quantum leap in the lowering of pour point temperatures has been achieved without the degradation of other required salient properties of well fluid base oils, including retention of environmental acceptability.

U.S. Pat. No. 5,589,442 (Gee et al.) discloses well fluid base oil which is predominantly unbranched (linear) internal olefins. The Gee et al. patent discloses the use of C12 to C24 olefins in their mixture, preferably C14–C18 olefins. The disclosure of the Gee et al. patent permits the presence of some branched olefins in their mixtures (0–50 wt %) with the remainder being linear olefins. The disclosure of the Gee et al. patent also permits the presence of some alpha olefins in their mixture (0–20 wt %) with the remainder being internal olefins. The pour point of the preferred embodiment of the Gee et al. disclosure is −5° C. with some formulations having pour points as low as −9° C.

This invention is directed to well fluid base oils having pour points lower than −25° C. The base oils of this invention are comprised of mixtures of predominantly linear (unbranched) internally isomerized olefins of tetradecene (C14) and hexedecene (C16). In one embodiment of this invention, a well fluid base oil having a pour point of −39° C. is disclosed. In an especially preferred embodiment of this invention, a well fluid base oil having a pour point of −33° C. is disclosed.

DETAILED DESCRIPTION OF THE PREFERRED EMBODIMENTS

For the purposes of this invention, a well fluid is intended to be any fluid or near fluid used in the rotary method of drilling wells, chiefly for gas and oil, and is not intended to be restricted only to so-called drilling muds. A non-limiting list of well fluids includes drilling muds, spotting fluids, lubricating additives, and other products for the treatment of subterranean wells. Also, for the purposes of this invention, internally isomerized olefins are defined to comprise olefins having only a single double bond (mono-olefin) located adjacent to a carbon atom other than the terminal (or alpha) carbon atom of the carbon chain. Mixtures of internal olefin isomers implied that several different skeletal isomers are present, e.g., some of the olefins may have a double bond connecting carbon atom #2 to carbon atom #3, some double bonds may connect carbon atom #3 to carbon atom #4, etc. For each skeletal isomer, there will be at lest two stereo isomers commonly referred to as the cis and trans forms.

The present invention relates to a group of synthetic hydrocarbons and to well fluids based on them, especially to well fluids which are useful in the rotary drilling process used for making wells into subterranean formations containing oil, gas or other minerals.

The rotary drilling process is used for making wells for the production of oil, gas and other subterranean minerals such as sulfur. In rotary drilling operations, a drill bit at the end of a drill string is used to penetrate the subterranean formations. This drill bit may be driven by a rotating drill string or a drill motor powered, for example, by hydraulic power. During the rotary drilling operation, a fluid, conventionally referred to as a drilling mud, is circulated from the drilling equipment on the surface down to the drill bit where it escapes around the drill bit and returns to the surface along the annular space between the drill bit and the surrounding subsurface formations. The drilling mud lubricates the downhole equipment and serves as a carrier to bring the formation cuttings to the surface where they can be separated from the mud before it is recirculated. In addition, the drilling mud serves to counterbalance formation pressures and may also form a cake around the walls of the borehole to seal the formations.

The lubricating action of the drilling mud is particularly important with the conventional rotating drill string since it provides a lubricant or cushion between the rotating drill pipe and the walls of the borehole, helping to prevent sticking of the drill string in the hole. The characteristics and performance of drilling muds are described, for example, in Kirk-Othmer, Encyclopedia of Chemical Technology, Third Edition, John Wiley and Sons, 1982, under Petroleum (Drilling Muds). This reference discloses a description of drilling muds and the materials used in formulating them.

Drilling muds are usually classified as either water based muds or oil-based muds, depending upon the character of the continuous phase of the mud, although water-based muds may contain oil and oil-based muds may contain water. Water-based muds conventionally comprise a hydratable clay, usually of the montmorillonite family, suspended in water with aid of suitable surfactants, emulsifiers and other additives including salts, pH control agents and weighting agents such as barite. The water makes up the continuous phase of the mud and is usually present in any amount of at least 50 volume percent of the entire composition. Oil is also usually present in minor amounts but will typically not exceed the amount of the water so that the mud will retain its character as a water-continuous phase material. Oil-based muds generally use a hydrocarbon oil as the main liquid component with other materials such as clays or colloidal asphalts added to provide the desired viscosity together with emulsifiers, gellants and other additives including weighting agents. Water may be present in greater or lesser amounts but will usually not be greater than 50 volume percent of the entire composition. If more than about 10 weight percent water is present, the mud is often referred to as an invert emulsion, i.e. a water-in-oil emulsion. In invert emulsion fluids, the amount of water is typically up to about 40 weight percent with the oil and the additives making up the remainder of the fluid. Under appropriate conditions, the well fluid base oils of the present invention may comprise any of the above-described materials, i.e., water-based fluids, oil-based fluids, and invert emulsion fluids.

Historically, oil-based muds were conventionally formulated with diesel oil or kerosene as the main oil component as these hydrocarbon fractions generally possess the requisite viscosity characteristics. They do, however, possess the disadvantage of being relatively toxic to marine life and the discharge of drilling muds containing these oils into marine waters is usually strictly controlled because of the serious effects which the oil components may have on marine organisms. The control is particularly acute for marine life which are commercially important as food. For this reason, offshore drilling rigs must return oil-based muds to shore after they have been used whereas water-based muds may generally be discharged into the ocean without any deleterious effects.

Oil-based muds may be environmentally acceptable by the use of oils which possess low inherent toxicity to marine organisms and good biodegradability. These properties are more generally found in hydrocarbons with low aromaticity. For these reasons, well fluids based on paraffins might be considered desirable. On the other hand, linear paraffins tend to have high pour point temperatures and the higher molecular weight fractions tend to be waxy so that in the low temperature environments frequently encountered in offshore drilling, there is a significant risk that waxy paraffin deposits will be formed in the downhole equipment or in the riser connecting the sea bed to the drilling equipment. In either event, this is unacceptable with the result that highly paraffinic oils have not achieved any significant utility as bases for well fluids.

The use of olefins as base oils for well fluids represents yet another way to avoid the toxicity associated with the use of aromatics in well fluid base oils and has become a pursued alternative in recent years. Linear alpha and internal olefins have all found application as components of well fluid base oils. The present invention is directed to well fluid base oils comprising intermediate chain (predominantly unbranched) internal olefins. For the purposes of this invention, predominantly unbranched olefins is defined to be at least 70% unbranched (linear) olefins. A mixture of C14 and C16 internal olefin isomers comprises the composition of the well fluid base oils of this invention. These predominantly linear internal olefins are made by the isomerization of the corresponding predominantly linear C14 and C16 alpha olefin to mixtures of internal olefin isomers. The starting materials are taken from commercial grade streams of predominantly linear C14 and C16 alpha olefins which are in excess of 95 wt % alpha olefins before isomerization to internal olefins. The olefins in this predominantly linear alpha olefin stream (over 95 wt % alpha) are subjected to conditions which lead to internal migration of the olefinically unsaturated double bond in the presence of an isomerization catalyst. The isomerization catalysts employed are those which cause only negligible branching thereby producing a product of mixed internal olefin isomers which are predominantly (as previously defined) unbranched. Mixtures of these C14 and C16 internal olefin isomers produce well fluid base oils which are environmentally acceptable and which have surprisingly low pour points, lower than –25° C., and typically in the range of –25° C. to –35° C. In all of the embodiments of this invention, well fluid base oils comprising mixtures of internal linear tetradecene (C14) isomers and internal linear hexadecene (C16) isomers have pour point temperatures lower than –25° C. These base oils also have low levels of marine toxicity.

According to the present invention, these very low pour point synthetic base oils are made by mixing, about 50–100 wt % internal predominantly linear tetradecene isomers and about 0–50 wt % internal predominantly linear hexadecene isomers. The linear internal olefin isomers (both the C14 isomers and the C16 isomers) are made by the isomerization of the corresponding linear alpha olefins. The C14 and C16 alpha olefins may be separately isomerized and then mixed in the correct proportions or may be mixed as alpha olefins and then isomerized in the same reaction vessel. The isomerization is conducted under mild conditions in the presence of an isomerization catalyst such as protic metal carbonyls, solid supported acids, homogeneous Lewis Acids, Zeolites, and solid supported homogeneous protic Lewis Acids. These catalysts produce a rearrangement of the molecular structure of the olefin by double bond isomerization, i.e. shift of the double bond from the alpha position to an internal position. The result of the isomerization produces liquids of low viscosity and low pour point. While not intended to be bound by theory, applicants believe that these highly desirable properties arise in part from the very deep internal isomerization of the olefinic double bond. The preferred isomerization catalysts and conditions employed produce substantial quantities of 4-olefins, and 5-olefins. Applicants further believe that the thermodynamic equilibrium mix of cis and trans stereo isomers produced under the catalyst and conditions employed also contribute to the presence of the desired properties found in the well fluids base oils of this invention.

More specifically, the two preferred olefin isomerization catalysts useful in manufacture of the internal olefin isomers included in the compositions of this invention are iron pentacarbonyl and Nafion® SAC13. The Nafion® series of catalysts is available from DuPont. These catalysts are preferred because they produce a mix of internal olefin isomers which are rich in deep internal olefins.

Typical isomerization temperatures are in the range of 50° C.–300° C. with a preferred temperature range of 180° C.–250° C. The preferred temperature range produces a mix of internal olefin isomers which are especially rich in deep internal olefins. A more complete description of the isomerization process, conditions and suitable catalysts may be found in a recently published European Patent Application published as patent document EP 787,706.

The preferred embodiments of this invention include compositions comprising 50–100 wt % C14 predominantly linear internal olefins and 0–50 wt % C16 predominantly linear internal olefins. Formulations according to these weight percentages produce well fluid base oils having pour points lower than −25° C. To some degree, the compositions are open ended permitting the inclusion of typical additives and additive packages in the formulations. In other instances, sometimes simply for the sake of convenience of available materials or as a means to reduce the cost of the base oils, other materials may contribute a portion of formulation of the base oils. Additional and/or optical materials may be added to the formulations only to the extent that the resulting base oils maintain their two salient features which are (1) pour point temperature less than −25° C. and (2) passing the 96 hour $LC_{50}$ mysid shrimp toxicity test. Olefins readily available from a commercial product stream may be included in the formulation. Example 3 from the Examples section of this specification discloses such a case. Generally, these olefins other than C14 and C16 would be present only in amounts of less than 35 wt % and would be preferably isomerized to internal olefins when included in the base oil formulations. While the disclosure of this invention has been wholly directed to even carbon number olefins, the use of odd carbon number olefins in minor amounts (less than 35 wt %) is also envisioned by applicants. Generally the possible inclusion of C13, C15, and C17 substantially linear olefins envisioned would preferably be isomerized to internal olefins prior to formulation. Again, while not wishing to be bound by theory, it appears that a higher percentage of C14 internal olefins in the formulations lowers the pour point and viscosity while a higher percentage of C16 internal olefins raises the flash point.

EXAMPLES

Example 1

Predominantly linear alpha tetradecene (C14) was taken from a high purity commercial stream consisting of greater than 97 wt % alpha tetradecene. No conventional hexedecene stream was available at the time of Example 1 preparation, so it was necessary to use material taken from a commercial stream consisting of predominantly linear alpha hexadecene (C16) and predominantly linear alpha octadecene (C18) each of which comprised about 50 wt % of the stream. Again, as for the tetradecene stream, the mixed C16/C18 stream was about 97 wt % alpha olefin. The hexadecene (C16) was separated from the mixed stream by known distillative techniques. The alpha tetradecene and the separated alpha hexadecene were separately subjected to internal olefin isomerization. The catalyst employed was Nafion SAC13 and the isomerization conditions used were as described in a recently published European Patent Application published as patent document EP 787,706.

For Example 1, a well fluid base oil was prepared comprising 60 wt % C14 internally isomerized olefins (C15 IO) and 40 wt % C16 internally isomerized olefins (C16 IO). The base oil of this Example 1 had the properties as listed in Table 1 below. In Table 1 below the viscosity was measured by the method of ASTM D-445, the pour point was measured by the method of ASTM D-97, and the flashpoint was measured by the method of ASTM D-93.

TABLE 1

Example 1

Properties of a Well Fluid Base Oil
Mixture of 60 wt % C14 IO and 40 wt % C16 IO

| Viscosity | cSt |
|---|---|
| 40° C. | 2.1 |
| 20° C. | 3.4 |
| 10° C. | 4.4 |
| 0° C. | 5.8 |
| −5° C. | 6.6 |
| Pour Point | −33° C. |
| Flash Point | 123° C. |

The base oil of Example 1 was subjected to aquatic toxicity testing. A drilling mud was made consisting of 10 volume % base oil of Example 1 and 90 volume % EPA Generic Mud #7, according to the 96 hour $LC_{50}$ mysid shrimp (*Mysidopsis bahia*) acute toxicity test wherein the percentages of each component are given in volume percent. In this and other toxicity tests, the $LC_{50}$ (50% lethality concentration) is the concentration (typically expressed as ppm) of a test sample that produces 50% mortality in the test organisms and can be used as a measure of that sample's acute toxicity. Samples having an $LC_{50}$ of greater than 30,000 ppm are defined as passing the test under criteria set forth by the NPDES. Samples of drilling muds which meet this standard are considered to be non-toxic. The bioassays were conducted using the suspended particle phase (SPP) of the drilling mud as described above following the United States Environmental Protection Agency (EPA) protocol in Appendix 3 of "Effluent Limitation Guidelines and New Source Performance Standards: Drilling Fluids Toxicity Test," Federal Register Vol. 50, No. 165,34631–34636. The SPP is the unfiltered supernatant extracted from a stirred 1:9 mixture of the drilling mud and sea water which was allowed to settle 1 hour. Samples of the drilling mud whose composition was as stated above were found to have an $LC_{50}$ greater than 100,000 ppm demonstrating that these base oils of predominantly linear internal olefin isomer mixtures are minimally toxic when used in well fluids.

Examples 2–3

For Examples 2 and 3, the isomerization of the alpha olefins to internal olefins was conducted in the manner as given for Example 1. For Example 2, 100 wt % C14 IO as described in Example 1 was used as the base oil. For the base oil of Example 3, 50 wt % C14 IO as described in Example 1 was used. The balance of the base oil of Example 3 consisted of a mixture of C16 IO and C18 IO. The mixture of C16 IO and C18 IO was formed from a commercial stream comprising predominantly linear alpha hexadecene (C16) and predominantly linear alpha octadecene (C18). The mixed C16/C18 stream was about 97 wt % alpha olefin of which about 60 wt % was hexadecene (C16) and about 40 wt % was octadecene (C18). This mixed C16/C18 alpha olefin stream was isomerized without separating it into C16 and C18 fractions in the same manner as described for Example 1. The mixed C16/C18 internally isomerized olefin product was used to make up the remaining 50 wt % of the base oil of Example 3. The flash point and pour point for Examples 2 and 3 were measured in the manner as described for Example 1. Table 2 below further summarizes the composition and properties of Example 2 and 3.

TABLE 2

Properties of the Base Oils of Examples 2 and 3

|  | Example 2 | Example 3 |
|---|---|---|
| Wt % C14 IO | 100 | 50 |
| Wt % C16 IO | 0 | 30 |
| Other Olefins | — | 20 wt % C18 IO |
| Pour Point | −39° C. | −28° C. |
| Flash Point | 112° C. | 124° C. |

The specification and the examples of this invention have largely disclosed compositions having utility as well fluid base oils. Those skilled in the art will recognize that a great variety of other functional fluids could benefit from the compositions of this invention and should be considered to be embodied within the scope of the invention. Also, use of the base oils of this invention as a properties enhancing diluent for other fluids as a means to incorporate some or all of the salient features of the base oils of this invention into other compositions should also be considered to be embodied within the scope of this invention.

We claim:

1. A process for drilling wells comprising use of well fluids comprising well fluid base oils comprising about 50 to 100 wt % substantially linear internal tetradecene isomers and about 0 to 50 wt % substantially linear internal hexadecene isomers wherein said base oils have pour point temperatures lower than −25° C.

* * * * *